(12) United States Patent
Williams et al.

(10) Patent No.: US 9,390,433 B2
(45) Date of Patent: Jul. 12, 2016

(54) SYSTEM AND METHOD FOR HYPER LOCAL ADVERTISEMENTS IN A MOBILE COMMUNICATION NETWORK

(75) Inventors: David Lothele Williams, Menlo Park, CA (US); Rohan Koduvayur Krishnan Chandran, Sunnyvale, CA (US); Kelvin Voon-Kit Chong, Mountain View, CA (US); Srinivas A. Mandyam, San Jose, CA (US); Krishna Vedati, Los Altos, CA (US); David Kurtz, Redwood City, CA (US); Susheel Daswani, San Francisco, CA (US)

(73) Assignee: Yellowpages.com LLC, Tucker, GA (US)

( * ) Notice: Subject to any disclaimer, the term of this patent is extended or adjusted under 35 U.S.C. 154(b) by 615 days.

(21) Appl. No.: 13/311,509

(22) Filed: Dec. 5, 2011

(65) Prior Publication Data

US 2013/0144717 A1 Jun. 6, 2013

(51) Int. Cl.
*G06Q 30/02* (2012.01)
*H04W 4/02* (2009.01)

(52) U.S. Cl.
CPC ............. *G06Q 30/0251* (2013.01); *H04W 4/02* (2013.01)

(58) Field of Classification Search
CPC .................................................. G06Q 30/0251
USPC .......................................................... 705/14
See application file for complete search history.

(56) References Cited

U.S. PATENT DOCUMENTS

| | | | |
|---|---|---|---|
| RE43,430 E * | 5/2012 | Domnitz ........................ 455/461 |
| 2003/0125958 A1* | 7/2003 | Alpdemir et al. ............. 704/275 |
| 2003/0216960 A1* | 11/2003 | Postrel .............................. 705/14 |
| 2006/0178932 A1* | 8/2006 | Lang ................................. 705/14 |
| 2008/0040219 A1* | 2/2008 | Kim et al. ........................ 705/14 |
| 2008/0160956 A1* | 7/2008 | Jackson et al. ................ 455/406 |
| 2008/0233924 A1* | 9/2008 | Baird et al. ................ 455/414.1 |
| 2010/0036711 A1* | 2/2010 | Shenfield ............... G06Q 30/02 705/14.64 |
| 2010/0036717 A1* | 2/2010 | Trest ............................ 705/14.1 |
| 2010/0088179 A1* | 4/2010 | Desai et al. ................ 705/14.49 |
| 2010/0262987 A1* | 10/2010 | Imanilov ............................ 725/9 |
| 2011/0093320 A1* | 4/2011 | Blake et al. ................. 705/14.16 |
| 2011/0106613 A1* | 5/2011 | Felt et al. ..................... 705/14.46 |
| 2011/0185354 A1* | 7/2011 | Tanner et al. .................. 717/178 |
| 2011/0216890 A1* | 9/2011 | Vanier et al. ................ 379/88.04 |
| 2012/0197724 A1* | 8/2012 | Kendall ...................... 705/14.58 |
| 2012/0233158 A1* | 9/2012 | Braginsky et al. ............. 707/724 |
| 2012/0259705 A1* | 10/2012 | Monteverde ................ 705/14.58 |
| 2012/0278185 A1* | 11/2012 | Ramachandran ...... G06Q 30/02 705/14.73 |
| 2012/0330754 A1* | 12/2012 | Foladare et al. ........... 705/14.61 |
| 2013/0137463 A1* | 5/2013 | Busch ........................ 455/456.3 |

* cited by examiner

Primary Examiner — Matthew L Hamilton
(74) Attorney, Agent, or Firm — Alston & Bird LLP (57) ABSTRACT

Systems and methods are provided to transmit advertisements to users of mobile communications networks based, at least in part, on such users' real-time geospatial location and known interests. Advertisers transmit advertisements, such as directory listings, coupons, offers and promotions to a mobile advertising service. Each advertisement is associated with at least one geospatial location and at least one category. Users of mobile communication networks submit queries, via their mobile devices, to the mobile adverting service for advertisements relevant to the users' current geospatial location and interests. Advertisements meeting query criteria are selected and transmitted to the users' mobile devices.

20 Claims, 4 Drawing Sheets

_(12)_ United States Patent

SYSTEM AND METHOD FOR HYPER LOCAL ADVERTISEMENTS IN A MOBILE COMMUNICATION NETWORK

FIELD OF THE TECHNOLOGY

At least some embodiments disclosed herein relate, in general, to systems for providing information relating to businesses to end-users, and more particularly, to providing advertisements and product and service offerings to users of mobile communications networks based, at least in part, on users' real-time geospatial location and known interests.

BACKGROUND

Mobile communications networks have long been used to deliver information relating to businesses to end users. Such information includes, among other things, directory information and information relating to products and services such as, for example, advertisements of various types. Many mobile communications networks are additionally aware of end-users' geospatial location in real-time, as well as users' demographic information and online activities.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Various embodiments of the systems and methods provide advertisements to users of a mobile communication network for businesses that are in close proximity to users' current geospatial location and which generally relate to users' interests and preferences. For the purpose of the present disclosure, the term "advertisement" should be understood to refer to any type of electronic information that a business directs to users of a mobile network for the purpose of soliciting such users' business. Such information could comprise, for example, directory listings for a business on an online directory service, or coupons, advertisements and promotions for a business on an electronic advertising service.

Figure 1:
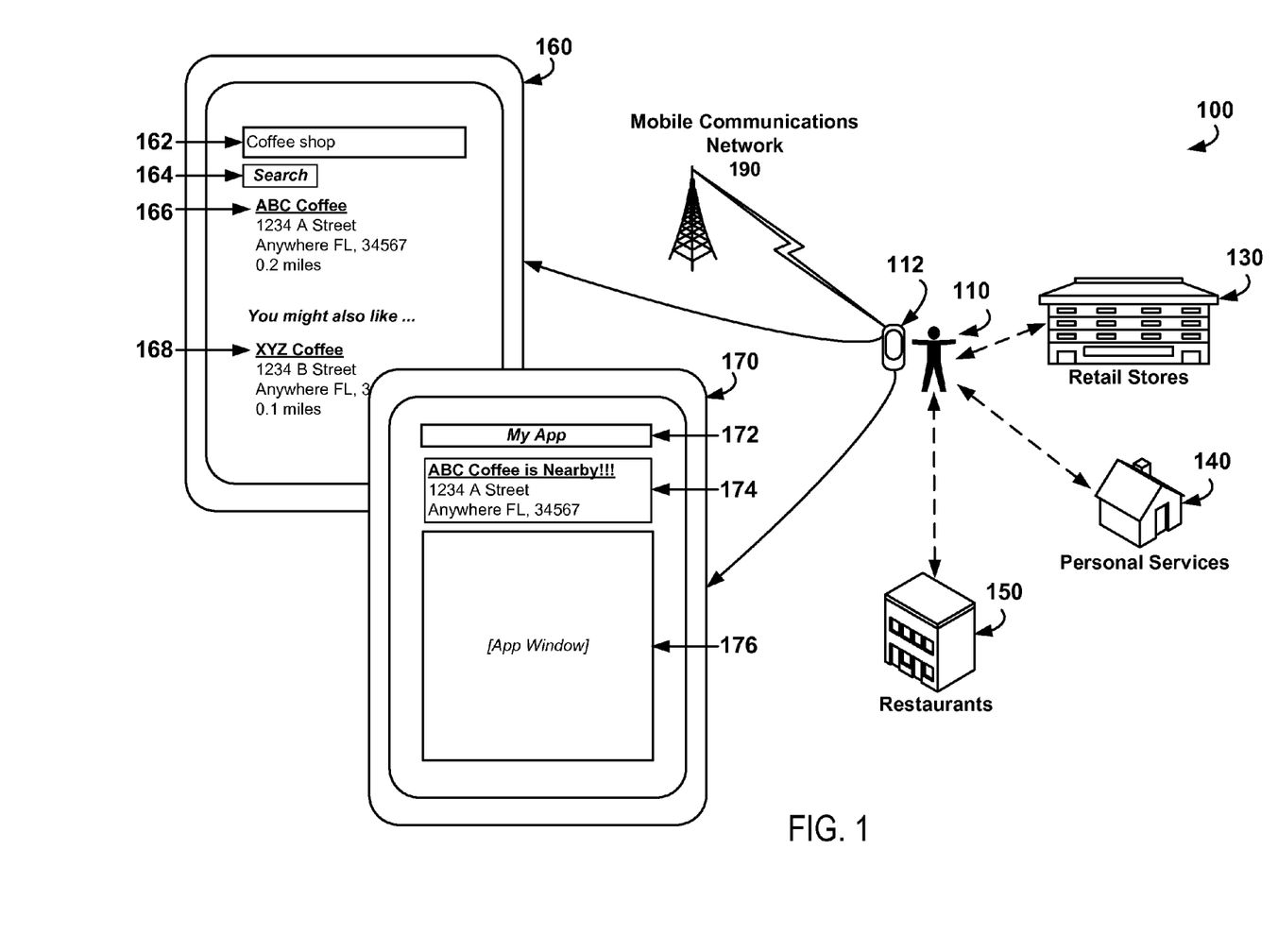
FIG. 1 shows a conceptual illustration of the operation of various embodiments of the systems and methods of the present disclosure.

FIG. 1 shows a conceptual illustration 100 of the operation of various embodiments of the systems and methods of the present disclosure.

A user is 110 is linked to a mobile communications network 190 via the user's mobile devices 112. The mobile communications network 190 can be any type of mobile communications network such as, without limitation, CDMA, GSM and satellite-based networks. The mobile device 112 can be any type of portable device capable of communicating with the mobile network such as, without limitation, cell phones, smart phones, PDAs, tablet PC's laptop PCs and PDAs. In various embodiments, the mobile communications network 190 provides voice and messaging capabilities and may provide access to other networks such as, for example, other mobile communications networks and/or the Internet.

The mobile communications network 190 tracks the geospatial location of the user's mobile device 112 in real-time or near-time as the devices moves with the user 110 from point to point. In various embodiments, the location of the mobile devices is determined using any technique now known, or later to be developed, in the art. For example, in an embodiment, the mobile device 112 automatically determines its geospatial location via built in GPS capabilities and communicates its location to the mobile communications network 190 periodically or continuously. Additionally or alternatively, in an embodiment, the mobile communications network 190 determines the location of the user mobile device 112 using capabilities inherent in the network such as by triangulation or by determining the nearest transmission tower to the devices.

In the illustrated example, the user 110 is at a geospatial position within the coverage area of the mobile communications network 190. The mobile communications network 190 is aware of, and actively tracks, the geospatial position of the user's mobile device 112. The user 110 interacts with the mobile devices 112 in a variety of ways including, without limitation, sending and receiving voice and text messages, sending and receiving emails, searching for subject matter using Internet based search and/or directory services and a variety of mobile apps hosted by the mobile device 112.

In so interacting with his or her mobile device, the user 110 broadcasts data relating to the user's location history and online activities over the mobile communications network 190. The user's location history and online activities reflects the user's interests and preferences. Additionally, the user 110 expressly defines, inter alia, his or her interests and preferences to various services that the user subscribes to, for example, a mobile advertising service (not shown). In an embodiment, the user defines such interests and preferences in a list of categories of interest.

In the illustrated example, the user 110 is currently in close geospatial proximity (e.g. within 0.5 miles) of a variety of businesses that are potentially of interest to the user, including retail stores 130, personal services 140 and restaurants 150. At a first point in time, the user accesses an online directory service (e.g. online YELLOW PAGES) 160 using a special purpose mobile app or a generic web browser. In the illustrated example, the user wants to buy a cup of coffee, and enters the search term "coffee shop" into a query entry box 162 and clicks on the search button 164. In response, the user receives two directory listings 166 and 168 for coffee shops 150 that are in close proximity to the user's 110 mobile device 112.

The directory listings 166 and 168 are shown displayed as simple name and address listings with a distance to each respective location. Note however, the directory listings could take any format known in the art suitable for displaying advertisements on a mobile device such as, for example, a text abstract for a business, text and graphics describing the business and/or multimedia files describing the business. In various embodiments, the directory listings could include any other type of information relating to the business such as, for example, sales, deals or promotions offered by the business. In an embodiment, the directory listings 166 and 168 could be displayed on a map of the geographical area surrounding the user 110.

In an embodiment, the directory listings 166 and 168 are directory listings for the two closest coffee shops 150 to the user. In an embodiment, the directory listings 166 and 168 are directory listings for the two coffee shops 150 that are in close proximity to the user and who have additionally paid for placement in search results for a category or a keyword (e.g. "sponsored search" results for "coffee").

In the illustrated example, the top-ranked directory listing 166 displays a directory listing for "ABC Coffee", which is the user's favorite brand of coffee. In an embodiment, the user 110 explicitly defines his or her preference for "ABC Coffee" to a mobile advertising service (not shown), for example, as one category in a list of categories. In an embodiment, a mobile advertising service determines that the user 110 prefers "ABC Coffee" using data relating to the user's previous online activity (e.g. searches, purchases, and/or websites visited). In the illustrated example, the directory listing 166 for "ABC Coffee" is displayed in preference to closer coffee shops, for example, "XYZ Coffee" as reflected in the second-ranked directory listing 168.

In the illustrated example, the second-ranked directory listings 168 displays an advertisement for "XYZ Coffee", which is unfamiliar to the user 110, but which is close by and relevant to the user's 110 query (e.g. by keyword or category). In the illustrated example, the location for "XYZ Coffee" is actually closer to the user 110 than the location for "ABC Coffee" and the user 110 could impulsively visit the location for "XYZ Coffee".

At a second point in time, the user 110 accesses a mobile app 170 on the user's mobile device. In an embodiment, the mobile app 170 could be any type of app, such as, for example, a mapping application, a communication application, a social networking application, a game, a news and information application or a web browser accessing a third-party website. In the illustrated example, the app 170 displays a title bar 172, a banner 174 displaying an advertisement and a window 176 directed to the function of the app 170.

Without any action on the part of the user 110, the banner 174 automatically displays an advertisement for a nearby location of "ABC Coffee Shop". In an embodiment, the banner 174 is displayed by a banner app (not shown) embedded in the mobile app 170. In an embodiment, the banner app automatically issues a search to a mobile advertising service (not shown) for advertisements relating to the user's 110 current geospatial position. In response, the mobile advertising service returns one or more advertisements relating to the user's 110 current geospatial position and which additionally relate to categories of interest to the user. The banner app embedded in the mobile app 170 then displays the advertisements in the banner 174 of the user interface of the mobile app 170.

In the illustrated example, an advertisement for "ABC Coffee" is selected, at least in part, because the user 110 is interested in "ABC Coffee", and at least in part because a location of "ABC Coffee" is close to the user's current geospatial position. In an embodiment, advertisements selected for mobile apps 170 utilizing a mobile advertising service are unrelated to the mobile app 170, and the same results are displayed regardless of the nature of the mobile app 170. In an embodiment, advertisements selected for mobile apps 170 utilizing a mobile advertising service are related to the nature of the mobile app 170. For example, advertisements selected for a mobile app 170 for a restaurant reservation service could relate to categories of interest to the user that generally relate to food. Such advertisements could relate, for example, to a category "restaurants".

In the illustrated example, the advertisement displayed in the banner 174 is shown as a simple name and address listing. Note however, the advertisements could take any format known in the art suitable for displaying advertisements on a mobile device such as, for example, a text abstract for a business, text and graphics describing the business, multimedia files describing the business. In various embodiments, the directory listings could include any other type of information relating to the business such as, for example, sales, deals or promotions offered by the business. In an embodiment, advertisements could be displayed on a map of the geographical area surrounding the user 110.

In an embodiment, the directory listings and the advertisements referenced in the examples originate from a mobile advertising service provider (not shown in FIG. 1) that provide the directory listings and advertisements to the user via the mobile communications network 190. In various embodiments, the mobile advertising service provider could be an online directory service provider (e.g. online YELLOW PAGES) or could be any other electronic service provider that maintains information relating to businesses advertising activities.

Figure 2:
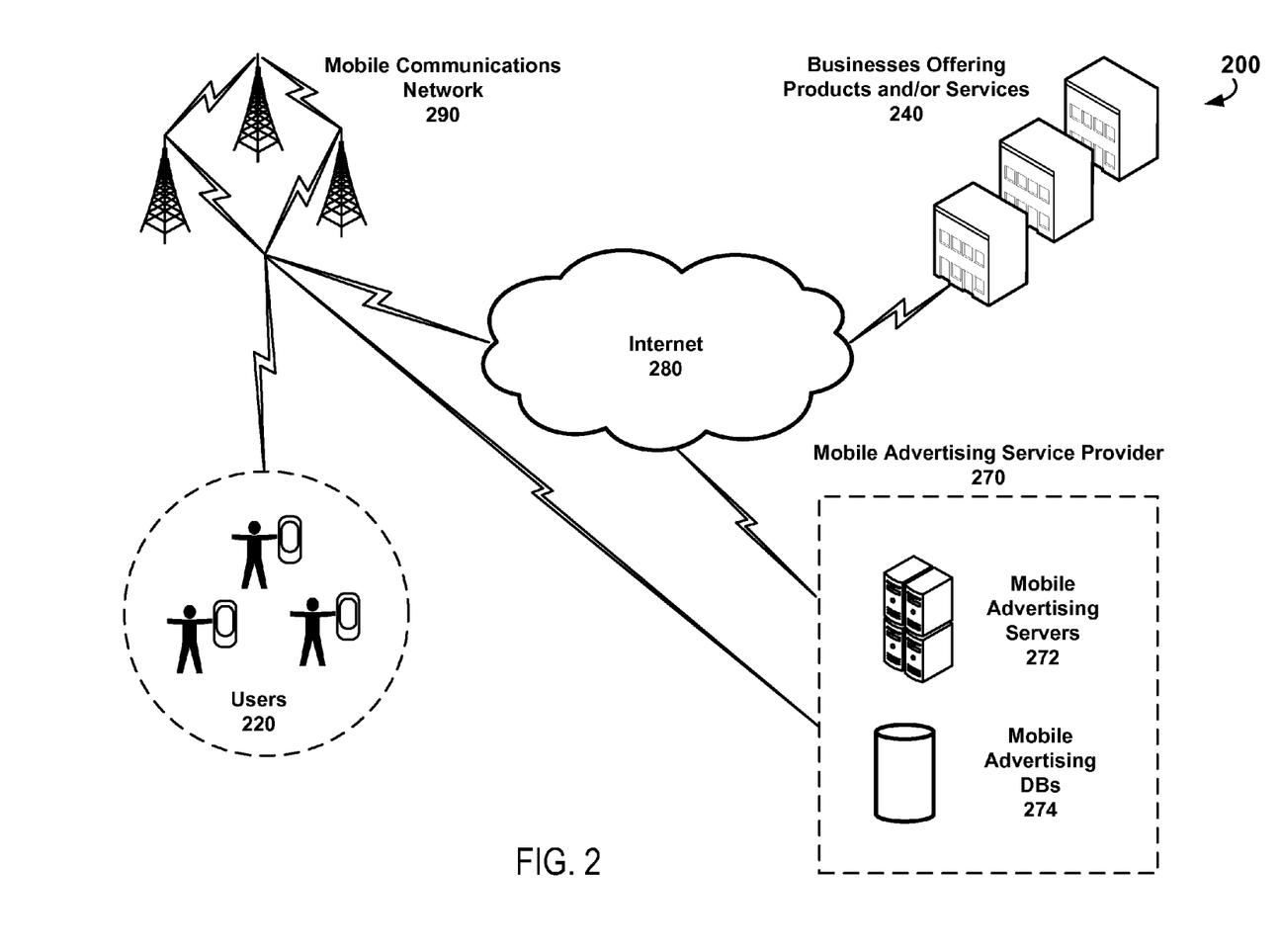
FIG. 2 illustrates an embodiment of a high level overview of a mobile advertising service provider and a network configuration through which the provider interacts with users and businesses (or other entities) that provide products and services.

FIG. 2 illustrates an embodiment of a high-level overview 200 of mobile advertising service provider 270 and a network configuration through which the provider interacts with users 220 and service and product providers 240.

In the illustrated embodiment, a number of businesses offering products and/or services 240 wish to advertise to users 220 of a mobile communications network 290. In an embodiment, the businesses 240 utilize the services of a mobile advertising service provider 270 to advertise to users 220 of a mobile communications network 290 that have an interest in the businesses' 240 products and/or services and who are in close geospatial proximity to one or more locations of such businesses 240.

In an embodiment, the businesses 240 communicates advertisements to the mobile advertising service provider 270 by any conventional means such as, without limitation, the Internet 280 via email or a website provided by the mobile advertising service provider, by voice message or text message and so forth.

In an embodiment, each advertisement comprises advertisement details that are presented to users 220 viewing the advertisement using their respective mobile devices. In various embodiments, advertisement details can specify any type of advertisement such as, for example, directory listings, coupons, offers, promotion or any other type of information relating to a business 240 that can be delivered to users' 220 mobile devices. In an embodiment, one or more geospatial locations to which the advertisement relates. In an embodiment, each advertisement additionally comprises information defining one or more categories to which the advertisement relates.

In an embodiment, data relating to advertisements are stored and updated on one or more mobile advertising databases 274 maintained by the mobile advertising service provider 270 via facilities hosted on one or more mobile advertising servers 272. Such advertisements could take the form of, without limitation, text objects, HTML objects, media objects, voice messages and text messages, and could be communicated to users 220 mobile devices via any available means such as, for example, via the Internet 280 or via any other facilities provided by the mobile communications network 290.

In an embodiment, facilities hosted on the mobile advertising servers 272 obtain data relating to the location of users 220 and the users' interactions with their mobile devices via the mobile communications network 290. In an embodiment, the mobile advertising servers 272 archive historical information on the mobile advertising databases 274 relating to users' 220 geospatial locations over time. In an embodiment, the mobile advertising servers 272 archive historical information on the mobile advertising databases 274 relating to historical information relating to users' 220 interactions with their mobile device over time.

In an embodiment, the mobile network 290 provides data relating to all users 220 of the mobile network to the mobile advertising service provider 270 on a periodic or continuous basis. In an embodiment, users 220 explicitly register with the mobile advertising service provider 270 and the mobile network 290 only provide data relating to registered users to the mobile advertising service provider 270. In an embodiment, users 220 register with the mobile advertising service provider 270 and maintain various types of profile information stored on the mobile advertising databases 274 via facilities provided by the mobile advertising servers 272 such as, for example, a website.

In an embodiment, the facilities hosted on the mobile advertising servers 272 provide facilities to enable users 220 to maintain one or more lists of categories of interest to the users. For example, the facilities hosted on the mobile advertising servers 272 could provide a user interface on a user's 220 mobile devices to allow the user to create, edit and delete lists of categories of interest to the user 220. In an embodiment, a given user 220 may create and maintain one or more lists of categories of interest, where each list is relevant to a context of the user. Such contexts can include, without limitation, to the user's location, a date, days of the week, time of day and/or a social context of the user (e.g. in the company of family or friends).

In an embodiment, additionally or alternatively, the facilities hosted on the mobile advertising servers 272 automatically identify categories of interest to users 220 from the data relating to the users' 220 interactions with their mobile devices and create and/or update lists of categories for such users. In an embodiment, categories are inferred from text entered by users 220 into messages and/or search queries sent from the users' mobile devices using any textual, linguistic or semantic technique known in the art, for example, parsing and identifying keywords, key phrases and other textual signals within such text. In an embodiment, categories of interest to users are, additionally or alternative, inferred from other any other user 220 actions that do not relate to text entry, such as, for example, user selection of specific websites or directory entries.

In an embodiment, historical and informational data relating to users 220 are used to infer categories of interest to users 220. In an embodiment, historical and informational data relating to users 220 is used to create lists of categories for multiple user contexts. Such contexts can include, without limitation, relate to the user's location, a date, days of the week, time of day and/or social context (e.g. in the company of family or friends).

In an embodiment, users 220, using facilities hosted on the mobile advertising servers 272, submit local advertisement queries to the mobile advertising service provider 270 to retrieve advertisements relevant to the users 220 current geospatial locations and interests. In an embodiment, local advertisement queries are explicitly issued by users 220 such as, for example, when a user enters a query into a directory service provided by the mobile advertising service provider. In an embodiment, such explicit queries can comprise one or more category of interest such as, for example, a "coffee shop" or a "sandwich shop".

In an embodiment, local advertisement queries are implicitly issued by users 220 such as, for example, when a user accesses a mobile application that automatically displays local advertisements. Examples of such applications could include, for example, any mobile application that embeds a banner display app such as that discussed above with respect to FIG. 1. In an embodiment, implicit queries comprise one or more categories of interest determined by the mobile app, for example, a mobile app for a restaurant reservation application could submit a query that includes a category of interest of "restaurant".

In an embodiment, implicit local advertisement queries do not indicate a category of interest determined by the mobile app but rather, simply comprise an identification of the user. In an embodiment, such queries are implicitly directed to interests of the user as defined by a list of categories of interest to the user. In an embodiment, if the user 220 maintains multiple lists of categories that relate to varying user contexts, the list of categories most relevant to the user's current context is used.

In an embodiment, the facilities hosted on the mobile advertising servers 272 automatically issue implicit local advertisement queries on behalf of users 220 in response to various events relating to such users 220. Such events could include, for example, a lapse of time, a change in the current geospatial location of the users' 220 mobile device or an access a specific mobile app by the users' 220 mobile device.

In an embodiment, facilities hosted on the mobile advertising servers 272 process local advertisement queries by selecting advertisements stored on the advertisement database 274 that relate to the users' 220 current geospatial location and interests In an embodiment, for each local advertising query, facilities hosted on the mobile advertising servers 272 select all advertisements matching the user's interests that relate to locations that are less that a threshold distance from the user's 220 current geospatial location (e.g. 0.5 miles). In an embodiment, such a threshold distance is explicitly stated in the query (e.g. may be set by an app issuing an implicit query). In an embodiment, such a threshold distance is a system default.

In an embodiment, for each local advertising query, facilities hosted on the mobile advertising servers 272 select all advertisements matching the users' interests that relate to locations within bounded geospatial areas in which the users 220 are located. In an embodiment, such bounded geospatial areas could comprise any geospatial area having predefined boundaries such as, for example, a neighborhood, a city or a state.

In an embodiment, for each local advertising query, facilities hosted on the mobile advertising servers 272 transmit the details of advertisements selected in response the query to the mobile device of the user 220 issuing the query. In an embodiment, facilities hosted on the mobile advertising servers 272 transmit the details of advertisements to the mobile device of the user 220 via any available communications channels suitable for transmitting the advertisement to such mobile devices. In an embodiment, such channels include the Internet 280 and/or the mobile communications network 290.

In an embodiment, for each local advertising query, facilities hosted on the mobile advertising servers 272 order the advertisements selected by the query prior to transmission such that the advertisements in the query result set are ranked according to distance from the user 220 in ascending order (e.g. closest first). In an embodiment, for each local advertising query, facilities hosted on the mobile advertising servers 272 order the advertisements selected by the query prior to transmission such that the advertisements that relate to one or more categories of in a list of categories of interest to the user are ranked first (e.g. most "interesting" first).

Figure 3:
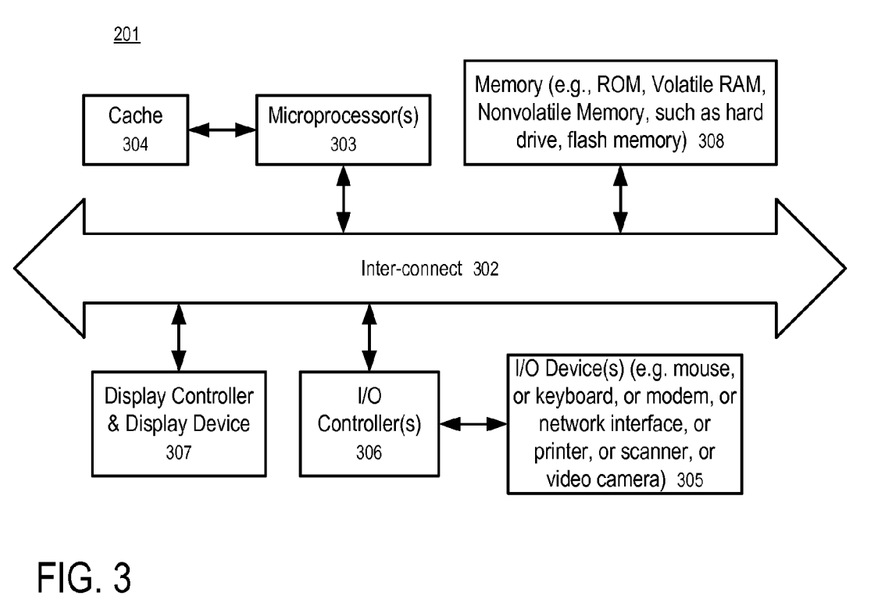
FIG. 3 shows a block diagram of a data processing system that can be used in various embodiments of the disclosed system and method.

FIG. 3 shows a block diagram of a data processing system, which can be used in various embodiments of the disclosed system and method. While FIG. 3 illustrates various components of a computer system, it is not intended to represent any particular architecture or manner of interconnecting the components. Other systems that have fewer or more components may also be used.

In FIG. 3, the system 301 includes an inter-connect 302 (e.g., bus and system core logic), which interconnects a microprocessor(s) 303 and memory 308. The microprocessor 303 is coupled to cache memory 304 in the example of FIG. 3.

The inter-connect 302 interconnects the microprocessor(s) 303 and the memory 308 together and also interconnects them to a display controller and display device 307 and to peripheral devices such as input/output (I/O) devices 305 through an input/output controller(s) 306. Typical I/O devices include mice, keyboards, modems, network interfaces, printers, scanners, video cameras and other devices that are well known in the art.

The inter-connect 302 may include one or more buses connected to one another through various bridges, controllers and/or adapters. In one embodiment the I/O controller 306 includes a USB (Universal Serial Bus) adapter for controlling USB peripherals, and/or an IEEE-1394 bus adapter for controlling IEEE-1394 peripherals.

The memory 308 may include ROM (Read Only Memory), and volatile RAM (Random Access Memory) and non-volatile memory, such as hard drive, flash memory, etc.

Volatile RAM is typically implemented as dynamic RAM (DRAM) that requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In an embodiment, the mobile advertising servers 272 of FIG. 2 are implemented using one or more data processing systems as illustrated in FIG. 3. In an embodiment, user devices such as user mobile devices 112 and 122 of FIG. 1 and 220 of FIG. 2 are implemented using one or more data processing system as illustrated in FIG. 3.

In some embodiments, one or more servers of the system illustrated in FIG. 3 are replaced with the service of a peer-to-peer network or a cloud configuration of a plurality of data processing systems, or a network of distributed computing systems. The peer-to-peer network, or cloud based server system, can be collectively viewed as a server data processing system.

Embodiments of the disclosure can be implemented via the microprocessor(s) 303 and/or the memory 308. For example, the functionalities described above can be partially implemented via hardware logic in the microprocessor(s) 303 and partially using the instructions stored in the memory 308. Some embodiments are implemented using the microprocessor(s) 303 without additional instructions stored in the memory 308. Some embodiments are implemented using the instructions stored in the memory 308 for execution by one or more general-purpose microprocessor(s) 303. Thus, the disclosure is not limited to a specific configuration of hardware and/or software.

Figure 4:
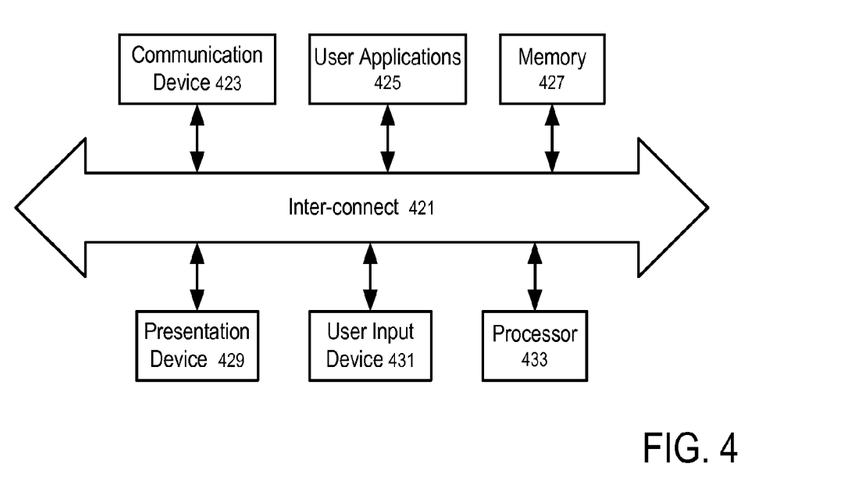
FIG. 4 shows a block diagram of a user device according to one embodiment.

FIG. 4 shows a block diagram of a user device, such as the devices 1112 and 122 of FIG. 1 and 220 of FIG. 2 according to one embodiment. In FIG. 4, the user device includes an inter-connect 421 connecting a communication device 423, such as a network interface device, a presentation device 429, such as a display screen, a user input device 431, such as a keyboard or touch screen, user applications 425 implemented as hardware, software, firmware or a combination of any of such media, such various user applications (e.g. apps), a memory 427, such as RAM or magnetic storage, and a processor 433 that, inter alia, executes the user applications 425.

In one embodiment, the user applications implement one or more user interfaces displayed on the presentation device 429 that provides users the capabilities to, for example, access the Internet, send and receive messages and/or receive and display advertisements transmitted by a mobile advertising service provider such as the provider 270 or FIG. 2. In one embodiment, the user applications uses the communication device to communicate with mobile advertising servers such as that shown in 272 of FIG. 2 to retrieve data relating to businesses stored in the address book database stored in local memory 427.

In one embodiment, users use the user input device 431 to interacts with the device via the user applications 425 supported by the device, for example, by accessing and interacting with websites, messages and advertisements described in detail above with respect to FIGS. 1 and 2. The user input device 431 may include a text input device, a still image camera, a video camera, and/or a sound recorder, etc.

Figure 5:
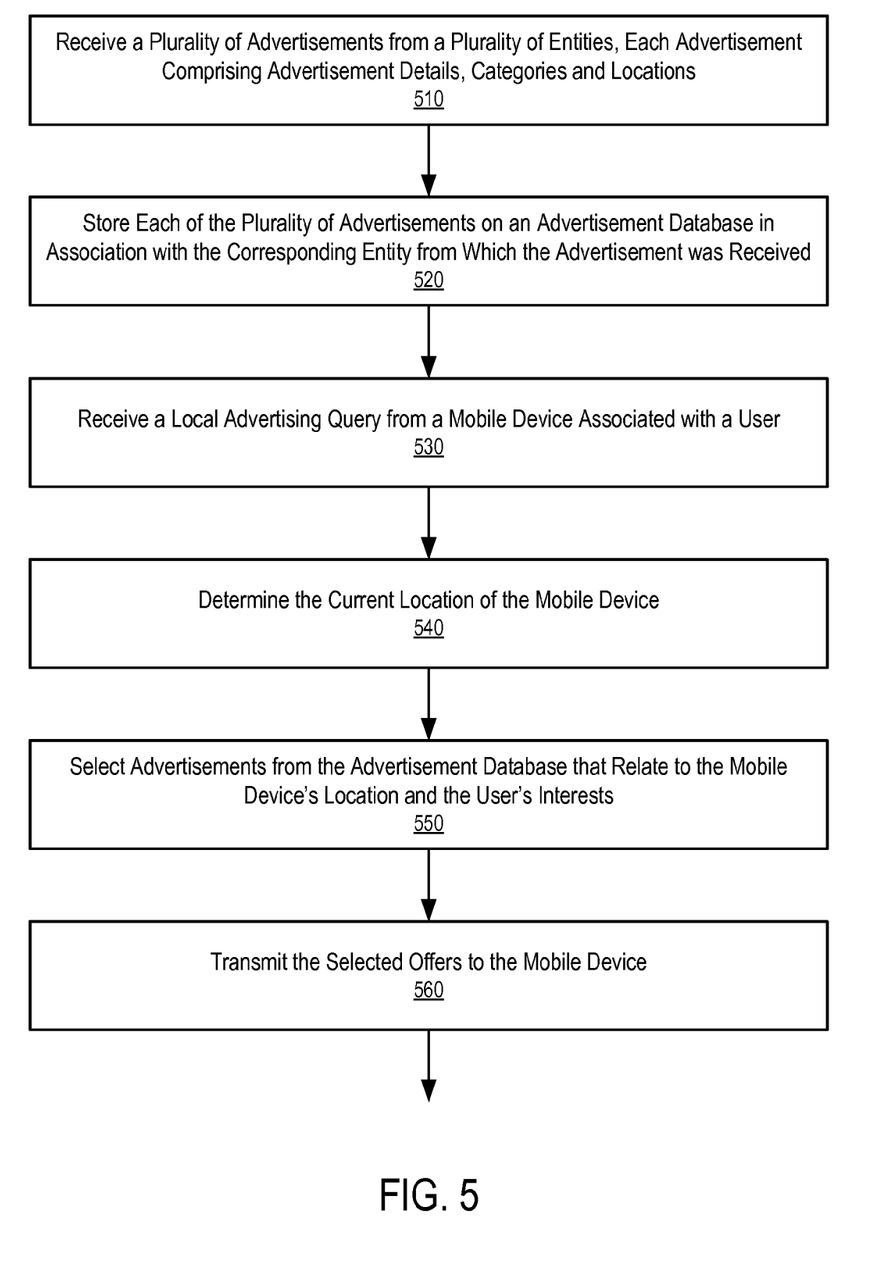
FIG. 5 shows a method for delivering advertisements to a user that relate to the user's geospatial location and preferences.

FIG. 5 shows a method for delivering advertisements to a user that relate to the user's current geospatial location and interests. In one embodiment, one or more servers such as the mobile advertising servers shown in 272 of FIG. 2 perform the operations of the method shown in FIG. 5, and mobile advertising databases such as that shown in 274 of FIG. 2 store the data collected and stored by the method.

In the first operation of the method, one or more processes running on a server receive 510, over a network, a plurality of advertisements from a plurality of entities. Each advertisement comprises advertisement details, at least one advertisement location and at least one advertisement category. In an embodiment, advertisement details can provide data relating to any type of advertisement such as, for example:
Directory listings
Coupons
Offers
Promotions Advertising details can be expressed in any format, such as, for example, text objects and multimedia objects such as images, audio files and/or audiovisual data. In an embodiment, advertisement details could include one or more of the following fields:
A description of the entity associated with the advertisement.
A description of a product, brand or service associated with the advertisement.
A description of a coupon, offer or promotion associated with the advertisement.
Freeform text relating to any matter.
Temporal criteria, such as dates, times and/or days of the week the advertisement is active.

In an embodiment, advertisement locations are geospatial locations to which an advertisement relates. In an embodiment, an advertisement could relate to a single location, for example, an advertisement could relate to:
A happy hour at a local bar.
Breakfast at a local restaurant.
An opening at a local art gallery.

In an embodiment, an advertisement could relate to multiple locations, for example, an advertisement could relate to:
A sale on golf clubs offered at multiple locations of a chain sporting goods stores.
A coupon for chicken soup redeemable at multiple locations of a chain of supermarkets.
A happy hour offered at multiple locations of a chain of restaurants.

In an embodiment, advertisement locations can be expressed in any conventional format known in the art such as, for example, a street address, latitude and longitude or GPS coordinates.

In an embodiment, advertisement categories are categories to which the advertisement relates. In various embodiments, advertisement categories could relate to any topic of potential interests to users. For example, such categories could include such broad topics as:
Sports
Food
Art In an embodiment, such categories could additionally include narrower topics, such as:
Baseball
Babe Ruth
Chinese food
Dim sum
A specific restaurant
Impressionist art
Monet
A specific art gallery In an embodiment, advertisement categories can be expressed in any conventional format known in the art such as, for example, a text string comprising a key word or a key phase a key referring to an entry in a reference database, a symbol, a token or set of tokens.

In an embodiment, the advertisements the processes running on a server receive the advertisements via any conventional means known in the art, for example, via a mobile communications network, via the Internet and/or an internal network of a mobile advertising service provider. In an embodiment, the processes running on a server receive the advertisements in any format suitable for transmission of electronic data for example, via text messages, voice messages, text files in any format such as XML, multimedia files, emails and so forth.

In the second operation of the method, one or more processes running on the server store 520 each advertisement of the plurality of advertisements on an advertisement database in association with a respective one of the plurality of entities from which the respective advertisement was received. In an embodiment, the advertisement database can be any type of database now known or later to be developed in the art such as, for example, an object oriented database or a conventional RDBMS. In an embodiment, the advertisements on the database are indexed by the advertisement's geospatial location, categories and any other relevant fields such as, for example, the starting date and time and the ending date and time for the advertisements.

In the third operation of the method, one or more processes running on a server receive 530, over a network, a local advertisement query from a mobile device associated with a user. In an embodiment, the processes running on a server receive the query in any format suitable for transmission of electronic data for example, via text messages, voice messages, text files in any format such as XML, multimedia files, emails and so forth.

In an embodiment, the local advertisement query comprises, at a minimum, an identification of the user. The identification of the user could comprise any symbol, token or set of tokens that identify the user to the processes running on a server, such as, for example, a user ID on a mobile advertising service or a cell or mobile phone number for the user.

In an embodiment, the local advertisement query additionally comprises a threshold distance from the user's current geospatial location. In an embodiment, the threshold distance from the user's current geospatial location could be expressed in any conventional format known in the art for expressing measures of distance such as, for example, in miles, kilometers or degrees of latitude and longitude.

In an embodiment, the local advertisement query additionally comprises one or more query categories. In various embodiments, query categories could relate to any topic of potential interests to users. In an embodiment, query categories can be expressed in any conventional format known in the art such as, for example, a text string comprising a key word or a key phrase, a key referring to an entry in a reference database, a symbol, a token or set of tokens.

In the fourth operation of the method, one or more processes running on a server determine 540 the current geospatial location of the mobile device. As described above in detail, in various embodiments, servers associated with a mobile advertising service provider, continuously or periodically receive data relating to the geospatial location of the mobile device.

In an embodiment, a mobile communication network pushes the location data to the server without an explicit request. In an embodiment, the server issues one or more requests for data to the mobile communications network, for example, for data relating to users known to a mobile advertising service provider, for all users known to the mobile communications network or for a user issuing a local advertisement query. In an embodiment, data relating to users geospatial location is received and stored in any format now known or later to be developed in the art such as, for example, latitude and longitude, GPS coordinates, and so forth.

In the fifth operation of the method, one or more processes running on the server select 550 at least one advertisement stored on the advertisement database that relates to the user's current geospatial location and interests.

In an embodiment, an advertisement relates to the user's current geospatial location where one or more locations associated with the advertisement are at a distance from the user's current geospatial location that is less than a threshold distance. In an embodiment, the local advertisement query specifies the threshold distance. In an embodiment, the mobile advertising service provides the threshold distance as a system default. In an embodiment, an advertisement relates to the user's current geospatial location where one or more locations associated with the advertisement are within a bounded geospatial area in which the user's mobile device is also located. In an embodiment, such a bounded geospatial area could comprise any geospatial area having predefined boundaries such as, for example, a neighborhood, a city or a state.

In an embodiment, an advertisement relates to the user's interests where one or more categories associated with the advertisement match one or more query categories specified in the local advertisement query. In an embodiment, an advertisement relates to the user's interests where one or more categories associated with the advertisement match one or more categories in a list of categories associated with the user. In an embodiment, an advertisement relates to the user's interests where one or more categories associated with the advertisement match one or more categories in a list of categories associated with the user and the user's context. In an embodiment, contexts can include, without limitation, information relating to the user's location, a date, days of the week, time of day and social context (e.g. in the company of family or friends).

In an embodiment, where temporal criteria are associated with one or more advertisements and a current time associated with the users mobile device does not match such temporal criteria, the processes running on the server do not select such advertisements. In an embodiment, such temporal criteria could comprise, for example, dates, times and/or days of the week the advertisement is active.

In the sixth operation of the method, one or more processes running on the server transmit 560, over the network, the selected advertisements to the user's mobile device using facilities provided by the mobile communications network including, without limitation, text messaging, voice messaging and/or multimedia messaging capacities provided by the network. In an embodiment, the user's mobile device receives and display advertisements using the application that issued the local advertisement query. In an embodiment, the users' mobile devices receive and display advertisements by opening an application designed for displaying advertisements. In an embodiment, the mobile advertising service transmits advertisements as flash files that are immediately displayed by user mobile devices without any action on the part of the user.

In an embodiment, the selected advertisements are ordered before transmission such that the advertisements are ordered according to the distance from the geospatial location of the user's mobile device (e.g. closest first). In an embodiment, query result sets are ordered before transmission, such that the advertisements that relate to one or more categories of in a list of categories of interest to the user are ranked first (e.g. most "interesting" first).

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
receiving a plurality of advertisements from a plurality of business entities, each respective advertisement of the plurality of advertisements comprising respective advertisement details, a respective advertisement location and a respective advertisement category;
receiving, via a wireless communication network, from a mobile device associated with a user, a local advertisement query submitted with a first application of the mobile device at a first time and at a first location, wherein the query comprises an identification of the user, the first application installed and being executed on the mobile device;
inferring, by a computing device, a set of one or more categories of interest to the user based at least in part on the local advertisement query and/or one or more other actions of the user with the mobile device;
receiving, by the computing device, via the wireless communication network, a second location of the mobile device at a second time after the first time, wherein the second location is a geospatial location that is different from the first location, the received second location is determined by a global positioning system (GPS) device of the mobile device of the user;
selecting, by the computing device, one advertisement of the plurality of advertisements, wherein the respective advertisement location of the one advertisement of the plurality of advertisements relates to the second location and the respective advertisement category of the one advertisement of the plurality of advertisements relates to at least one inferred category of interest of the set of one or more categories of interest to the user, the at least one inferred category of interest having been inferred based at least in part on the local advertisement query and/or the one or more other actions of the user with the mobile device; and
transmitting, via the wireless communication network, to the mobile device, the respective advertisement details of the one advertisement of the plurality of advertisements to be presented by causing a second application installed on the mobile device to open and display, on a display device of the mobile device, the respective advertisement details without user interaction, wherein the second application is different from the first application.

2. The method of claim 1, wherein the respective advertisement location of the one advertisement of the plurality of advertisements relates to the mobile device's geospatial location where the respective advertisement location of the one advertisement of the plurality of advertisements is at a distance from the mobile device's geospatial location less than a threshold distance.

3. The method of claim 2, wherein the local advertisement query additionally comprises the threshold distance.

4. The method of claim 2, wherein the threshold distance is a predetermined default distance.

5. The method of claim 1, wherein the respective advertisement location of the one advertisement of the plurality of advertisements relates to the mobile device's geospatial location where the respective advertisement location of the one advertisement of the plurality of advertisements falls within a bounded geospatial area in which the mobile device is located.

6. The method of claim 5, wherein the bounded geospatial area is of a type selected from a list comprising: a neighborhood, a city, and/or a state.

7. The method of claim 2, wherein the local advertisement query additionally comprises the at least one inferred category of interest to the user.

8. The method of claim 1, wherein the at least one inferred category of interest to the user comprises a list of categories associated with the user.

9. The method of claim 1, wherein the at least one inferred category of interest to the user comprises a list of categories associated with the user and a context of the user.

10. The method of claim 9, wherein the context of the user comprises at least one context attribute selected from a list comprising: the user's geospatial location, a date, a day, a time of day, and/or a social context.

11. The method of claim 1, wherein the respective advertisement details of the one advertisement of the plurality of advertisements comprise respective temporal criteria that define an instance in which the one advertisement of the plurality of advertisements is active, wherein in an instance in which a current date and time associated with the mobile device does not match the respective temporal criteria of the one advertisement, the one advertisement is not selected and is not transmitted to the mobile device.

12. The method of claim 1, further comprising:
selecting, temporal criteria of the one advertisement of the plurality of advertisements from a list comprising: a date, a time, a date and time, a day, a range of dates, a range of times, a range of dates and times, and/or a range of days.

13. The method of claim 1, additionally comprising: storing, by the computing device, the plurality of advertisements on at least one adverting database, such that each respective advertisement of the plurality of advertisements is stored in association with a respective one entity of the plurality of entities from which the respective advertisement was received.

14. The method of claim 1, further comprising:
selecting at least two advertisements of the plurality of advertisements; and
ordering, by the computing device, the at least two advertisements of the plurality of advertisements into an order, such that the respective advertisement details of the at least two advertisements of the plurality of advertisements are transmitted to the mobile device in the order of the at least two advertisements.

15. The method of claim 14, wherein each of the at least two advertisements of the plurality of advertisements is ordered based on a respective distance between the respective advertisement location for the respective advertisement and the geospatial location of the mobile device.

16. The method of claim 14, wherein each of the at least two advertisements of the plurality of advertisements is ordered based on a respective relationship of the respective advertisement category of the respective advertisement and a list of categories associated with the user.

17. The method of claim 1, wherein the local advertisement query is not received from the mobile device, the method additionally comprising:

detecting, by the computing device, an event relating to the mobile device; and in response to detecting the event relating to the mobile device, generating, by the computing device, the local advertisement query.

18. The method of claim 17, wherein the event relating to the mobile device is selected from a list comprising: a lapse of time, a change in the geospatial location the mobile device, and/or an access of a mobile application by the mobile device.

19. A non-transitory computer-readable storage medium storing computer-readable instructions, which when executed, cause a system to perform:

receiving a plurality of advertisements from a plurality of business entities, each respective advertisement of the plurality of advertisements comprising respective advertisement details, a respective advertisement location and a respective advertisement category;

receiving, via a wireless communication network, from a mobile device associated with a user, a local advertisement query submitted with a first application of the mobile device at a first time and at a first location, wherein the query comprises an identification of the user, the first application installed and being executed on the mobile device;

inferring a set of one or more categories of interest to the user based at least in part on the local advertisement query and/or one or more other actions of the user with the mobile device;

receiving, via the wireless communication network, a second location of the mobile device at a second time after the first time, wherein the second location is a geospatial location that is different from the first location, the received second location is determined by a global positioning system (GPS) device of the mobile device of the user;

selecting one advertisement of the plurality of advertisements, wherein the respective advertisement location of the one advertisement of the plurality of advertisements relates to the second location and the respective advertisement category of the one advertisement of the plurality of advertisements relates to at least one inferred category of interest of the set of one or more categories of interest to the user, the at least one inferred category of interest having been inferred based at least in part on the local advertisement query and/or the one or more other actions of the user with the mobile device; and transmitting, via the wireless communication network to the mobile device, the respective advertisement details of the one advertisement of the plurality of advertisements to be presented by causing a second application installed on the mobile device to open and display, on a display device of the mobile device, the respective advertisement details without user interaction wherein the second application is different from the first application.

20. A computer system comprising:

a memory; and at least one processor coupled to the memory to:

receive a plurality of advertisements from a plurality of business entities, each respective advertisement of the plurality of advertisements comprising respective advertisement details, a respective advertisement location and a respective advertisement category;

receive, via a wireless communication network, from a mobile device associated with a user, a local advertisement query submitted with a first application of the mobile device at a first time and at a first location, wherein the query comprises an identification of the user, the first application installed and being executed on the mobile device;

infer a set of one or more categories of interest to the user based at least in part on the local advertisement query and/or one or more other actions of the user with the mobile device;

receive, via the wireless communication network, a second location of the mobile device at a second time after the first time, wherein the second location is a geospatial location that is different from the first location, the received second location is determined by a global positioning system (GPS) device of the mobile device of the user select one advertisement of the plurality of advertisements, wherein the respective advertisement location of the one advertisement of the plurality of advertisements relates to the second location and the respective advertisement category of the one advertisement of the plurality of advertisements relates to at least one inferred category of interest of the set of one or more categories of interest to the user, the at least one inferred category of interest having been inferred based at least in part on the local advertisement query and/or the one or more other actions of the user with the mobile device; and transmit, via the wireless communication network, to the mobile device, the respective advertisement details of the one advertisement of the plurality of advertisements to be presented by causing a second application installed on the mobile device to open and display, on a display device of the mobile device, the respective advertisement details without user interaction wherein the second application is different from the first application.

* * * * *